No. 733,621. PATENTED JULY 14, 1903.
W. G. BROWNE.
EGG BEATER.
APPLICATION FILED JULY 7, 1902.
NO MODEL.

Witnesses
William G. Browne, Inventor
By his Attorney
Nathaniel L. Frothingham

No. 733,621. Patented July 14, 1903.

UNITED STATES PATENT OFFICE.

WILLIAM G. BROWNE, OF KINGSTON, NEW YORK, ASSIGNOR TO THE W. G. BROWNE MANUFACTURING COMPANY, OF KINGSTON, NEW YORK, A CORPORATION OF NEW YORK.

EGG-BEATER.

SPECIFICATION forming part of Letters Patent No. 733,621, dated July 14, 1903.

Application filed July 7, 1902. Serial No. 114,540. (No model.)

*To all whom it may concern:*

Be it known that I, WILLIAM G. BROWNE, a citizen of the United States, residing at Kingston, in the county of Ulster and State of New York, have invented certain new and useful Improvements in Egg-Beaters, of which the following is a specification, reference being had therein to the accompanying drawings.

My invention relates to improvements in egg-beaters particularly adapted for hand use comprising eccentrically-mounted beater-blades rotating about the standards of the beater-frame.

The object of my invention is to provide an egg-beater wherein the means of securing the standards of the beater-frame to the handle will be such as to prevent the free ends thereof from becoming loose and being sprung out of place from any of the strains to which the said standards are subjected while in use, thus avoiding the racking, looseness, and consequent wear of the entire frame of the rotating mechanism and of the bows themselves.

A further object is to provide an extended base for said frame which will require no soldering, riveting, or other means of attachment and which will not from use become loosened or detached and which will present no corners or angles wherein dirt or other matter may accumulate.

The invention consists in those novel features of construction and arrangement of parts hereinafter set forth and described, and more particularly pointed out in the claims hereto appended.

Figure 2:
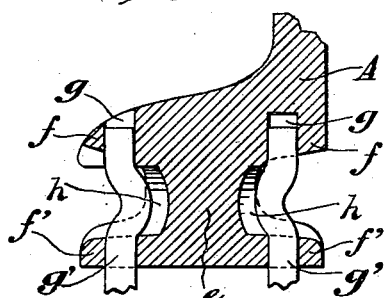
Figure 1:
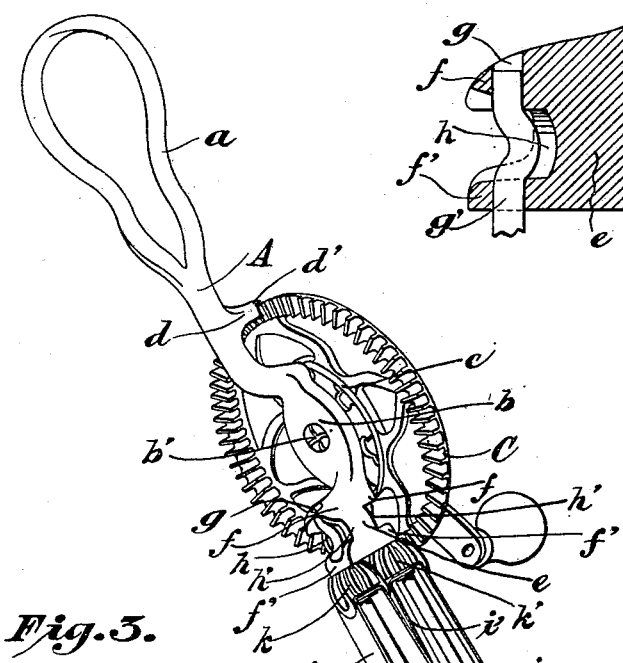
Figure 3:
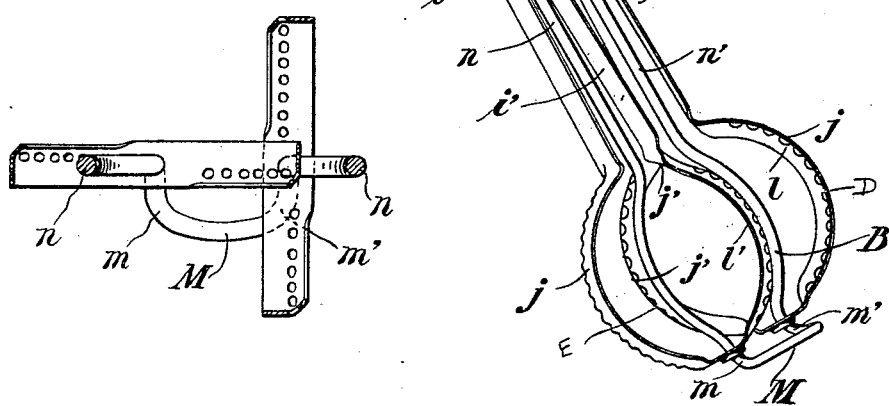

Referring to the drawings, Figure 1 is a perspective view of an egg-beater embodying my invention. Fig. 2 is an enlarged view in section of the lower portion of the handle, showing in detail the means of securing the beater-frame to the handle; and Fig. 3 is an enlarged plan view of the lower portion of the beater frame and blades, showing the extended base in detail.

Like letters refer to like parts throughout the several views.

The general arrangement of the beater contemplates a handle A, a beater-frame B, comprising upright standards secured thereto, a main driving-gear C, mounted upon said handle, beater-blades D and E, mounted, respectively, upon said standards and below said handle, and intermeshing pinions carried by said beater-blades and actuated by said main gear C to simultaneously and reversely rotate said beater-blades, all of which are well known in the art, my invention residing more particularly in the details of construction and the particular arrangement of these parts.

The handle A of the beater is preferably cast and is provided with the loop $a$, extending longitudinally of the beater, which loop is elongated and shaped to conform to the inside of the hand when closed to afford a more convenient and less awkward means of holding when in use, the thumb extending over the top and the little finger about the lower portion thereof. A short distance below said loop there is an offset portion $b$, bored centrally thereof to form an extended bearing for the main gear-wheel C, which is mounted upon the pivot-pin $b'$. The wheel C is provided with the usual hub and also with a balance-rim $c$, which is concentric with the outer rim of the wheel and extends into close juxtaposition to the portion $b$ to prevent an uneven action or wabbling of said wheel through wear or other causes of looseness.

A spur $d$ projects from the base of the loop $a$ into close juxtaposition to the uppermost portion of the main gear-wheel C and is provided with a lip $d'$, which overhangs said wheel. This spur aids in insuring an even rotation of the wheel and at the same time protects the finger from the teeth thereof and prevents interference with the free rotation of said wheel.

Below the offset portion $b$ the handle is provided with means whereby the frame for the beater-blades may be secured thereto, comprising an approximately central portion $e$, having on each side thereof a pair of oppositely-disposed shoulders $f\ f''$, which have openings, as $g\ g'$, therein, said openings being in substantial alinement. Webs, as $h\ h'$, extending from one shoulder to the other, are cast adjacent to said central portion, forming a recess between themselves and said shoulders, which recess, if desired, may be extended entirely through the handle, although, owing to the difficulties encountered in casting, said recesses preferably extend only a distance thereinto sufficient to form side bearings for the purpose more fully described hereinafter.

The beater blades or bows D and E are eccentrically mounted as to each other and comprise, respectively, the stems $i$ $i'$ and the bowed portion $j j'$. These blades are provided with openings at the base thereof and are attached to the intermeshing pinions $k$ $k'$ in the usual or any desired manner. Each blade rotates about one of the standards of the beater-frame. The bowed portions $j$ $j'$ are each provided with a flange, as $l$ $l'$, which is projected therefrom in a relation to the forward edge thereof as the blades are rotated to form an open gathering and retarding pocket, with said forward edge constituting a cutter edge in advance thereof. This flange as herein shown extends at an obtuse angle from said blade, and a series of openings are provided in the pocket so formed to permit the escape of matter therefrom in minute streams to occasion a more rapid and more thorough disruption thereof.

The beater-frame B above referred to is formed of a continuous wire rod, which is bowed in the usual manner to permit the free rotation of the beater-blades. The central portion of said wire rod, approximately midway between said bowed portions, instead of being depressed merely enough to form lower bearing-shoulders for the beater-blades is bent downwardly to a considerable extent and then outwardly laterally close to said bowed portions at $m$ $m'$ at an angle substantially perpendicular to the standards $n$ $n'$ to form not only such bearings, but also an integral extended base M, upon which the beater may rest firmly when in use or upon which it may be rested to avoid contact of the bows with the receptacle when it is desired to topple it over to bring matter within the influence of the said bows.

The free ends of the standards $n$ $n'$ are secured to the handle after the beater-blades have been mounted thereon in a manner to be more fully described hereinafter.

In assembling the device heretofore described the general relation of the handle, the frame, the main driving-gear, the beater blades and intermeshing pinions carried by and actuating same, and the operation thereof are well known. The balance-rim $c$ by such assembling is brought into such a relation to the offset portion $b$ of the handle A as to insure a more even action of said wheel and to prevent the main gear to a large extent from overriding the teeth of the pinion $k'$, and the toothed face of the outer rim thereof is brought into a similar relation to the spur $d$ to aid further to this same end. The peculiar form of handle is designed to form a much less awkward and more convenient means of holding the beater while using. The little finger while grasping said handle, however, is brought close to the main gear-wheel C, and the spur $d$ and lip $d'$ thereof overhanging said gear-wheel C are required to prevent the finger from being caught between the handle and said gear.

The base M, extending, as it does, laterally at an abrupt angle from and substantially perpendicularly to the rest of the rigid portions of the beater, forms a firm and extended base, which not only acts as a rest when the beater is held in a vertical position, but being offset affords a side rest which enables the beater to be held at an inclination, so as to bring the central portion of the bows close to the bottom of the receptacle without contacting therewith. This base, it will be observed, requires no soldering, riveting, or other means of attachment, presents no sharp angles or crevices wherein dirt or other matter can accumulate, and is of a structure which cannot become loose, so as to effect the stability of the standards, the beater-frame, or the life of the beater. Any disarrangement of the standards either at the top or at the bottom will result in an interference with the action of the pinions and the whole actuating mechanism and a resulting wear, which leads to the speedy destruction of said mechanism, and consequently of the entire beater. By making said base integral with said frame rigidity and cleanliness are secured, together with a minimum cost of production.

The beater-frame is secured to the handle A by inserting the free ends of the standards $n$ $n'$ upward through the alined openings $g$ $g'$ in the shoulders $f$ $f'$ and crimping the portion contained between said shoulders, forcing it between the webs $h$ $h'$, the said ends remaining within the openings $g$ $g'$. The arch of the crimped portion will, as shown in Fig. 2, engage each shoulder, and thus prevent vertical movement in either direction and the withdrawal thereof from said handle. By reason of the free ends of said standards being within the openings $g$ $g'$ and this inability to move vertically the standards cannot be so sprung by a lateral strain as to disarrange this connection, as a vertical movement would be required to free the ends of said standards. The webs $h$ $h'$ on each side of the crimped portion of said standards form side bearings which prevent a rotary movement of said standards due to a torsional strain. The standards will therefore be firmly affixed to the handle and a looseness thereof effectually prevented.

The operation of the individual beater-bows is not herein described, as they form the subject-matter of another application pending concurrently herewith.

It is not my intention to limit the invention to the precise construction herein shown and described, as it is obvious that there may be many deviations therefrom without departing from the spirit and scope of my invention. Although preferably the base M forms three sides of a rectangle, still its configuration is immaterial so long as it extends at an angle substantially perpendicular to the rest of the beater and is capable of a construction as and is adapted to perform the functions hereinbefore described.

Having described my invention, what I claim as new, and desire to have protected by Letters Patent, is—

1. In an egg-beater, a frame comprising a continuous rod forming upright standards and bent approximately centrally thereof and extended laterally at an angle to said standards to form an integral extended base therefor between said standards.

2. In an egg-beater, a frame adapted to be secured to the handle comprising a continuous rod forming upright standards about which the beater-bows are adapted to rotate, said rod being bent approximately centrally thereof and extended laterally at an angle to said standards to form an integral extended base for said frames between said standards.

In witness whereof I have hereunto affixed my signature this 3d day of July, 1902.

WILLIAM G. BROWNE.

Witnesses:
VIRGIL B. VAN WAGONER,
MABEL S. SNYDER.